(12) United States Patent
Savoie-Lavigueur et al.

(10) Patent No.: US 10,906,404 B2
(45) Date of Patent: Feb. 2, 2021

(54) EDDY CURRENT BRAKING SYSTEM AND METHOD FOR INSTALLING THE SAME ON A VEHICLE

(71) Applicants: Guillaume Savoie-Lavigueur, Coteau-du-lac (CA); Jesse Loiselle, St-LAmbert (CA)

(72) Inventors: Guillaume Savoie-Lavigueur, Coteau-du-lac (CA); Jesse Loiselle, St-LAmbert (CA)

(*) Notice: Subject to any disclaimer, the term of this patent is extended or adjusted under 35 U.S.C. 154(b) by 223 days.

(21) Appl. No.: 16/178,529

(22) Filed: Nov. 1, 2018

(65) Prior Publication Data

US 2019/0135115 A1 May 9, 2019

Related U.S. Application Data

(60) Provisional application No. 62/581,757, filed on Nov. 5, 2017.

(51) Int. Cl.
| | |
|---|---|
| *B60L 7/28* | (2006.01) |
| *B60T 13/74* | (2006.01) |
| *H02K 49/04* | (2006.01) |
| *B60T 1/06* | (2006.01) |
| *F16D 63/00* | (2006.01) |
| *F16D 65/22* | (2006.01) |

(52) U.S. Cl.
CPC ............ *B60L 7/28* (2013.01); *B60T 1/06* (2013.01); *B60T 13/748* (2013.01); *F16D 63/002* (2013.01); *F16D 65/22* (2013.01); *H02K 49/04* (2013.01); *H02K 49/046* (2013.01)

(58) Field of Classification Search
CPC . B60L 7/28; B60T 1/06; B60T 13/748; F16D 63/002; F16D 65/22; F16D 2121/20; H02K 49/04; H02K 49/046; H02K 49/043; H02K 7/104
USPC .................................................. 188/161, 164
See application file for complete search history.

(56) References Cited

U.S. PATENT DOCUMENTS

| | | | | |
|---|---|---|---|---|
| 5,023,499 | A * | 6/1991 | Kuwahara | H02K 49/043 310/105 |
| 5,143,183 | A * | 9/1992 | Kuwahara | H02K 49/043 188/158 |
| 5,145,038 | A * | 9/1992 | Kuwahara | H02K 49/043 188/158 |
| 5,154,623 | A * | 10/1992 | Kuwahara | H02K 49/043 188/164 |
| 5,219,050 | A * | 6/1993 | Kubomiya | H02K 49/043 188/164 |

(Continued)

*Primary Examiner* — Thomas W Irvin (57) ABSTRACT

An eddy current braking system for a wheel of a vehicle, the vehicle including a chassis and the wheel being rotatably mounted to the chassis, the wheel including a wheel rim made of an electrically-conductive material and extending annularly around a wheel cavity, the system comprising: a magnetic field generating member secured to the chassis and disposed annularly within the wheel cavity and proximal to the wheel rim, the magnetizable member being operable for generating a magnetic field towards the wheel rim to generate eddy current within the wheel rim upon rotation of the wheel; and a magnetic field controller operatively connected to the magnetic field generating member for selectively controlling an intensity of the magnetic field applied by the magnetic field generating member on the wheel rim.

18 Claims, 9 Drawing Sheets

(56) References Cited

U.S. PATENT DOCUMENTS

| | | | | |
|---|---|---|---|---|
| 5,437,353 A * | 8/1995 | Wu | ............... | A63B 21/0051 |
| | | | | 188/164 |
| 5,944,149 A * | 8/1999 | Kuwahara | ............ | H02K 49/043 |
| | | | | 188/156 |
| 6,025,664 A * | 2/2000 | Kuwahara | ............ | H02K 49/043 |
| | | | | 188/158 |
| 6,039,157 A * | 3/2000 | Yamada | ............ | H02K 49/043 |
| | | | | 188/158 |
| 6,176,355 B1 * | 1/2001 | Yamamoto | ............ | H02K 49/043 |
| | | | | 188/158 |
| 6,209,688 B1 * | 4/2001 | Kuwahara | ............ | H02K 49/043 |
| | | | | 188/156 |
| 6,220,403 B1 * | 4/2001 | Kobayashi | ............ | H02K 49/043 |
| | | | | 188/158 |
| 6,237,728 B1 * | 5/2001 | Kobayashi | ............ | H02K 49/043 |
| | | | | 188/158 |
| 6,293,375 B1 * | 9/2001 | Chen | ............... | H02K 49/046 |
| | | | | 188/161 |
| 6,328,142 B1 * | 12/2001 | Kuwahara | ............... | B60L 7/003 |
| | | | | 188/158 |
| 6,948,597 B2 * | 9/2005 | Kuwahara | ............ | H02K 49/043 |
| | | | | 188/158 |
| 7,594,626 B2 * | 9/2009 | Soderberg | ............... | B64C 25/36 |
| | | | | 244/100 R |
| 9,638,273 B2 * | 5/2017 | Schmidt | ............... | H02K 21/222 |
| 2016/0264265 A1 * | 9/2016 | Garland | ................ | B64G 1/222 |

\* cited by examiner

EDDY CURRENT BRAKING SYSTEM AND METHOD FOR INSTALLING THE SAME ON A VEHICLE

RELATED PATENT APPLICATION

The present application claims the benefit of U.S. Provisional Application No. 62/581,757 filed on Nov. 5, 2017, the specification of which is incorporated herein by reference.

TECHNICAL FIELD

The technical field generally relates to braking systems for vehicles, and more specifically to eddy current braking systems for vehicles.

BACKGROUND

Braking systems are used in vehicles to reduce the travelling speed of the vehicle. Many different types of braking systems may be used.

In wheeled vehicles, friction brakes such as disc brakes are commonly used. A friction brake typically includes a brake disc mounted on a wheel axle or spindle which rotates with the wheel, and a brake caliper including brake pads which can be placed against the rotating disc to thereby create friction opposing the rotation of the wheel. Unfortunately, braking using a friction brake causes wear on the parts of the brakes which are creating the friction, such as the brake pads and brake disc, which must be changed periodically to ensure that the friction brake remains functional.

Eddy current brakes use one or more magnets to create eddy current in a piece of conducting material, such as a rotating disc, moving near a pole of the magnets, which generates an opposite magnetic field creating a drag force in the moving piece. Unfortunately, available eddy current brakes usually involve a relatively large number of parts, and/or are complex and/or expensive to manufacture and install.

There is therefore a need for a braking system which will overcome at least one of the above-identified drawbacks.

SUMMARY

According to one aspect, there is provided an eddy current braking system for a wheel of a vehicle, the vehicle including a chassis and the wheel being rotatably mounted to the chassis, the wheel including a wheel rim made of an electrically-conductive material and extending annularly around a wheel cavity, the system comprising: a magnetic field generating member secured to the chassis and disposed annularly within the wheel cavity and proximal to the wheel rim, the magnetizable member being operable for generating a magnetic field towards the wheel rim to generate eddy current within the wheel rim upon rotation of the wheel; and a magnetic field controller operatively connected to the magnetic field generating member for selectively controlling an intensity of the magnetic field applied by the magnetic field generating member on the wheel rim.

In one embodiment, the magnetic field generating member includes: an annular frame configured to be coaxially disposed within the wheel rim and spaced radially inwardly therefrom, the annular frame having a first annular side face and a second annular side face, the annular frame including: a plurality of spaced-apart ferromagnetic portions and a plurality of spaced-apart non-ferromagnetic portions, the ferromagnetic portions and non-ferromagnetic portions being arranged in an alternating pattern along the annular frame; a plurality of receiving bores defined in the annular frame, each receiving bore extending through one of the non-ferromagnetic portions between the first and second annular side faces; and a plurality of movable dipole magnets rotatably mounted to the annular frame, each movable dipole magnet being received in a corresponding receiving bore, each movable dipole magnet having a first magnetic pole, a second magnetic pole located diametrically opposite the first magnetic pole and a magnetic axis extending through the first and second magnetic poles.

In one embodiment, the receiving bores and the movable dipole magnets are cylindrical.

In one embodiment, each movable dipole magnet includes a first hemicylindrical portion defining the first magnetic pole and a second hemicylindrical portion defining the second magnetic pole.

In one embodiment, each movable dipole magnet is received in at least one annular bearing disposed in the corresponding receiving bore.

In one embodiment, each receiving bore has a bore diameter corresponding to a diameter of a corresponding movable dipole magnet to allow the movable dipole magnet to be snuggly received in the receiving bore.

In one embodiment, the bore diameter is greater than a width of the corresponding non-ferromagnetic portion such that the bore further extends partially into the first and second adjacent ferromagnetic portions.

In one embodiment, the magnetic field controller includes a magnet actuator operatively connected to at least one of the movable dipole magnets for selectively rotating the at least one of the movable dipole magnets between an active position in which the magnetic axis of the at least one of the movable dipole magnets is oriented tangentially to the annular frame such that the first and second magnetic poles respectively face first and second adjacent ferromagnetic portions adjacent the corresponding non-ferromagnetic portion to magnetize the first and second adjacent ferromagnetic portions, and a non-active position in which the magnetic axis is oriented radially to the annular frame.

In one embodiment, the magnet actuator is further configured for selectively rotating the at least one of the movable dipole magnets to one of a plurality of intermediate positions between the active position and the non-active position.

In one embodiment, the magnet actuator is adapted to simultaneously rotate all the movable dipole magnets.

In one embodiment, the magnet actuator includes: an annular guide member disposed coaxially to the annular frame and rotatable relative to the annular frame; and a plurality of magnet guiding members, each magnet guiding member extending from a corresponding movable magnet, the magnet guiding members being configured to cooperate with the annular guide member to rotate the movable magnets upon rotation of the annular guide member.

In one embodiment, each movable dipole magnet includes a first magnet end disposed towards the first annular side face of the frame and a second magnet end disposed towards the second annular side face, each magnet guiding member including a guiding pin extending away from the second magnet end of the corresponding movable magnet, the guiding pin being offset relative to a rotation axis of the movable dipole magnet.

In one embodiment, the annular guide member includes a plurality of guiding grooves, each guiding groove being sized and shaped to receive the guiding pin of a corresponding movable magnet and to rotate the movable magnet upon rotation of the annular guide member.

In one embodiment, each guiding groove is linear and is angled between a radial axis and a tangential axis of the annular guide member.

In one embodiment, each magnet guiding member includes a driven gear coaxially mounted to the movable dipole magnet and the annular guide member includes an annular gear operatively engaging the driven gear.

In one embodiment, the movable dipole magnets are permanent magnets.

In one embodiment, the movable dipole magnets are electromagnets.

According to another aspect, there is also provided a wheel assembly for a vehicle, the vehicle including a chassis, the assembly comprising: a wheel rotatably connected to the chassis, the wheel including a wheel rim made of an electrically-conductive material; an annular frame coaxially disposed within the wheel rim and spaced radially inwardly therefrom, the circular frame having a first annular side face and a second annular side face, the circular frame including: a plurality of spaced-apart ferromagnetic portions and a plurality of spaced-apart non-ferromagnetic portions, the ferromagnetic portions and non-ferromagnetic portions being arranged in an alternating pattern along the annular frame; a plurality of receiving bores defined in the annular frame, each receiving bore extending through one of the non-ferromagnetic portions between the first and second annular side faces; a plurality of movable dipole magnets rotatably mounted to the annular frame, each movable dipole magnet being received in a corresponding receiving bore, each movable dipole magnet having a first magnetic pole, a second magnetic pole located diametrically opposite the first magnetic pole and a magnetic axis extending through the first and second magnetic poles; a magnet actuator operatively connected to the movable dipole magnets for selectively rotating each movable dipole magnet between an active position in which the magnetic axis of the movable dipole magnet is oriented tangentially to the annular frame such that the first and second magnetic poles respectively face first and second adjacent ferromagnetic portions adjacent the corresponding non-ferromagnetic portion to magnetize the first and second adjacent ferromagnetic portions, and a non-active position in which the magnetic axis is oriented radially to the annular frame.

According to yet another aspect, there is also provided a method for installing an eddy current braking system on a vehicle, the method comprising: providing a wheel assembly including a wheel and a friction braking system operatively connected to the wheel; removing the friction braking system from the wheel; and operatively mounting an eddy current braking system as described above to the wheel.

In one embodiment, the wheel includes a wheel rim made of an electrically-conductive material, and operatively connecting the magnetic braking system comprises: disposing the annular frame within the wheel rim, coaxially and spaced inwardly from the wheel rim.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Although the embodiments of the eddy current braking system and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the eddy current braking system, as will be briefly explained herein and as can be easily inferred herefrom by a person skilled in the art.

Referring first to FIGS. 1 to 5, there is provided a wheel assembly 100 for a vehicle, in accordance with one embodiment. The vehicle, not shown, could be any wheeled vehicle including a car, a truck, a trailer, a wheeled heavy equipment machine such as a loader or the like, a railroad car or any other wheeled vehicle that a skilled person would consider to be suitable for use with the present wheel assembly 100.

The vehicle includes a chassis 50 and the wheel assembly 100 includes a wheel 150 rotatably mounted to the chassis 50 such that when the vehicle travels over a ground surface, the wheel 150 rotates relative to the chassis 50 about a wheel rotation axis $R_1$. It will be understood that the wheel rotation axis $R_1$ extends generally perpendicular to a central longitudinal axis of the vehicle such that the wheel 150 has a front wheel side 152 facing outwardly away from the central longitudinal axis of the vehicle and a rear wheel side 154 facing inwardly towards the central longitudinal axis of the vehicle.

Figure 4:
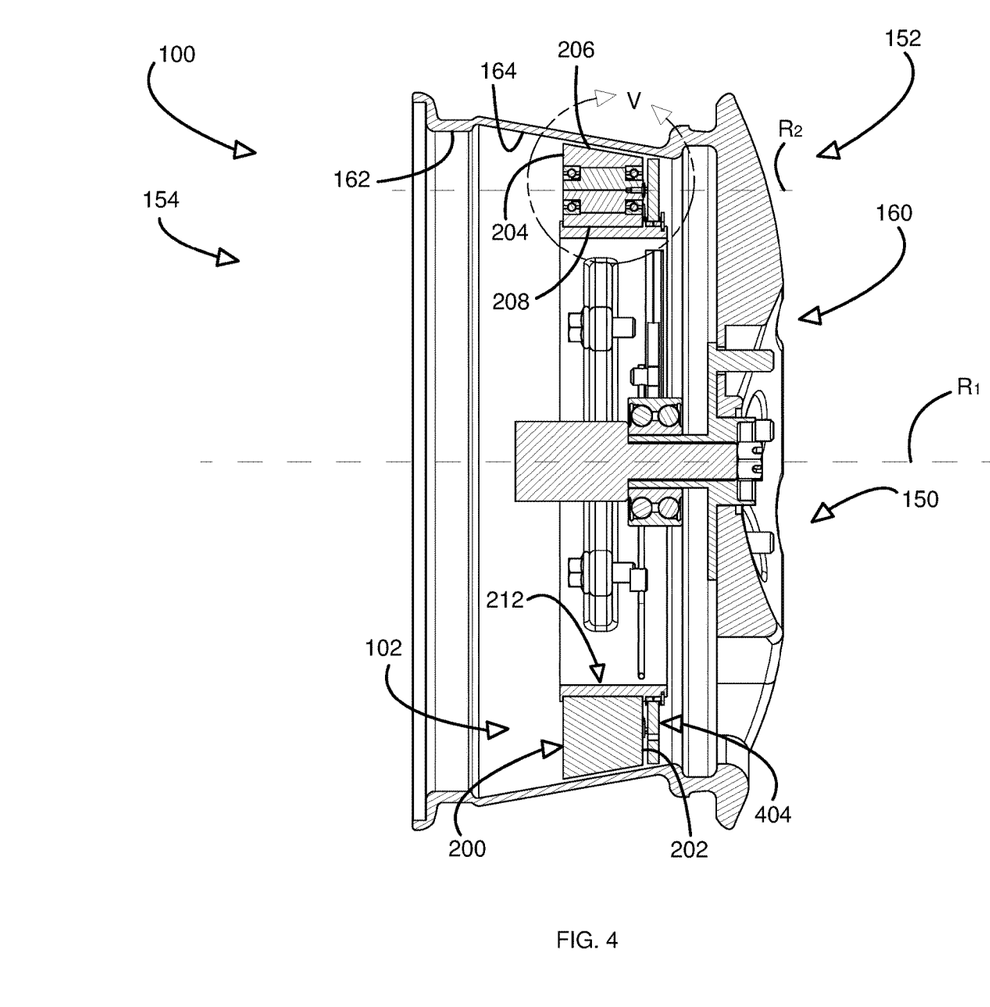
FIG. 4 is a cross-section view, taken along line IV-IV, of the wheel assembly as illustrated in FIG. 2.

In the illustrated embodiment, the wheel 150 is hollow and includes a wheel cavity 156 and a wheel rim 158 extending annularly around the wheel cavity 156. As best shown in FIG. 4, the wheel rim 158 extends rearwardly from a plurality of radially-extending spokes 160 located at the front wheel side 152 and includes a generally cylindrical rear rim portion 162 located at the rear wheel side 154 and a central rim portion 164 which extends between the rear rim portion 162 and the spokes 160. As best shown in FIG. 4, the rear rim portion 162 is generally cylindrical while the central rim portion 164 is generally conical and tapers from the rear rim portion 162 to the spokes 160.

In the illustrated embodiment, the wheel 150 further includes a tire 166 disposed around the wheel rim 158 for transferring the vehicle's load to the ground surface and to provide traction on the ground surface. Alternatively, the wheel 150 may not include a tire, and may instead include a continuous track looped around a plurality of adjacent wheels, or may be disposed directly on a rolling surface such as a railroad track.

In the illustrated embodiment, the wheel assembly 100 further includes an eddy current braking system 102 which cooperates with the wheel 150 to reduce a rotational speed of the wheel 150. Specifically, the eddy current braking system 102 may be used when the vehicle is travelling over the ground surface as an alternative to a traditional friction braking system to reduce the vehicle's travel speed or even to bring the vehicle almost to a complete stop.

Still in the illustrated embodiment, the eddy current braking system 102 includes a magnetic field generating member 104 which is disposed into the wheel cavity 156 to generate a magnetic field towards the wheel rim 158. Specifically, the wheel rim 158 is made of an electrically-conductive material such that the magnetic field generated towards the wheel rim 158 creates eddy currents in the wheel rim 158 and thereby contribute to reducing the rotational speed of the wheel 150.

In the illustrated embodiment, the magnetic field generating member 104 includes an annular frame 200 which is disposed annularly within the wheel cavity 156 and coaxially to the wheel rotation axis $R_1$. More specifically, the annular frame 200 is spaced radially inwardly from the wheel rim 158 and is generally proximal to the wheel rim 158.

Still in the illustrated embodiment, the chassis 50 includes a brake mounting arm 168 extending downwardly from an upper portion of the chassis to hold the annular frame 200 within the wheel cavity 156. Specifically, the brake mounting arm 168 is located rearwardly from the wheel 150 and includes a generally vertical top arm portion 170 connected to the upper portion of the chassis and a bottom arm portion 172 which is angled relative to the top arm portion 170 and which extends between the top arm portion 170 and into the wheel cavity 156, with the annular frame 200 being secured to the bottom arm portion 172. Alternatively, the chassis 50 may not include a brake mounting arm and the annular frame 200 could be held within the wheel cavity 156 and proximal to the wheel rim 158 using other holding means.

Still referring to FIGS. 1 to 5, the annular frame 200 includes a front annular side face 202 disposed towards the front wheel side 152 and a rear annular side face 204 disposed towards the rear wheel side 154 and extending parallel to the front annular side face 202. The annular frame 200 further includes outer and inner circumferential faces 206, 208 which are coaxial relative to each other and which extend between the front and rear annular side faces 202, 204.

Figure 5:
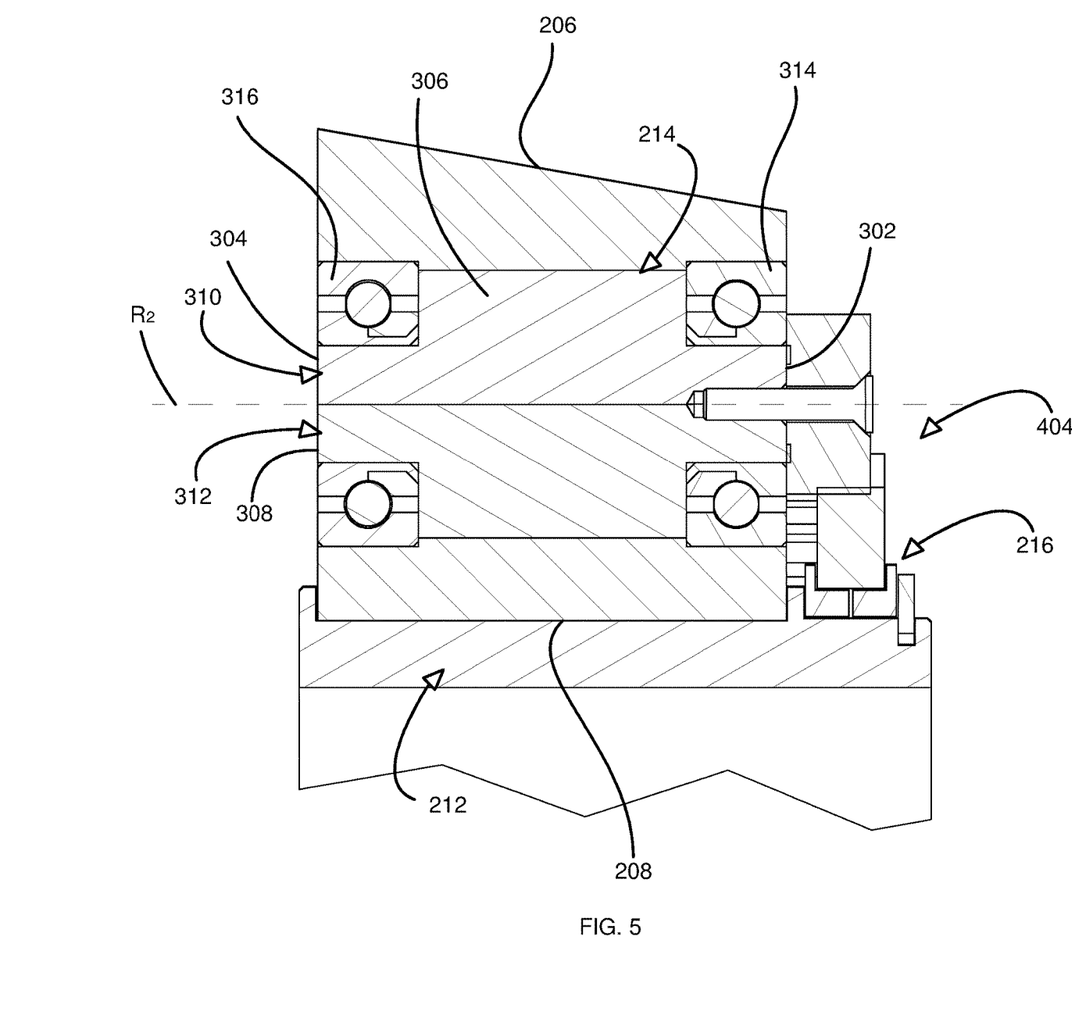
FIG. 5 is an enlarged portion, taken from area V, of the wheel assembly as illustrated in FIG. 4.

In the illustrated embodiment, the annular frame 200 is not cylindrical, but instead tapers from the rear annular side face 204 to the front annular side face 202. Specifically, when viewed in a cross-sectional view as shown in FIGS. 4 and 5, the inner circumferential face 208 is generally cylindrical and parallel to the wheel rotation axis $R_1$, while the outer circumferential face 206 is angled relative to the inner circumferential face 208. As further shown in FIG. 4, this configuration allows the outer circumferential face 206 to extend generally parallel to the central rim portion 164 of the wheel rim 158.

In another embodiment, instead of having a central rim portion which is conical, the wheel rim 158 may be entirely cylindrical. In this embodiment, the outer circumferential face 206 of the annular frame 200 could be cylindrical and therefore still parallel to the wheel rim 158. It will be appreciated that, depending on the shape of the wheel rim 158, the outer circumferential face 206 could have any other shape which allows the outer circumferential face 206 to extend parallel to the wheel rim 158. In yet another embodiment, the outer circumferential face 206 may not even be parallel to the wheel rim 158. For example, the outer circumferential face 206 could be tapered while the wheel rim 158 is cylindrical, or vice-versa. It will be understood that many alternative configurations may be considered.

Still referring to FIGS. 1 to 5, the annular frame 200 includes a plurality of wedge-shaped frame portions 210 which are secured to each other side-by-side to form the annular frame 200. In the illustrated embodiment, the annular frame 200 further includes a cylindrical inner panel 212 extending along the inner circumferential face 208 of the annular frame 200. The frame portions 210 are disposed along the cylindrical inner panel 212 and extend outwardly from the cylindrical inner panel 212. In one embodiment, the frame portions 210 may be secured to the cylindrical inner panel 212, which thereby holds the frame portions 210 together to maintain the circular shape of the annular frame 200. Alternatively, the annular frame 200 may not includes a cylindrical inner panel 212 and may instead be simply secured to each other.

The frame portions 210 include a plurality of ferromagnetic portions 210a and a plurality of non-ferromagnetic portions 210b arranged in an alternating pattern along the annular frame 200 such that each ferromagnetic portion 210a is disposed between two non-ferromagnetic portions 210b and each non-ferromagnetic portion 210b is disposed between two ferromagnetic portions 210a.

The magnetic field generating member 104 further includes a plurality of magnets 300 which are movable between an active position which allows the magnetic field generating member 104 to generate a magnetic field towards the wheel rim 158 and a non-active position in which the magnetic field generating member 104 does not substantially generate a magnetic field towards the wheel rim 158.

In the illustrated embodiment, the annular frame 200 further includes a plurality of receiving bores 214 extending between the front and rear annular side faces 202, 204 of the annular frame 200 and each magnet 300 is rotatably received in a corresponding receiving bore 214. More specifically, the receiving bores 214 are defined in the non-ferromagnetic portions 210b of the annular frame 200 such that when received in the receiving bores 214, the magnets 300 are disposed generally between the two ferromagnetic portions 210a adjacent the corresponding non-ferromagnetic portion 210b.

Still in the illustrated embodiment, each receiving bore 214 is cylindrical and each magnet 300 is similarly cylindrical and is sized and shaped to be snuggly received in the corresponding receiving bore 214. Alternatively, the receiving bores 214 and the magnets 300 could instead be conical, frustoconical, spherical or have any other shape which would allow the magnets 300 to rotate about a rotation axis.

Still in the illustrated embodiment, each receiving bore 214 has a bore diameter which is greater than a width of the corresponding non-ferromagnetic portion 210b through which the receiving bore 214 extends. More specifically, it will be understood that the width of each frame portion 210 varies between the outer circumferential face 206 and the inner circumferential face 208 of the annular frame 200. In the present embodiment, the receiving bore 214 is located at a certain radial position between the outer circumferential face 206 and the inner circumferential face 208, and the bore diameter is greater than the width of the corresponding non-ferromagnetic portion 210b at the radial position of the receiving bore 214. In this configuration, the magnet 300 therefore extends into and contacts the two adjacent ferromagnetic portions 210a when received in the corresponding receiving bore 214.

Referring to FIGS. 2, 4, 5, 7A and 8A, each magnet 300 has a length which generally corresponds to the distance between the front and rear annular side faces 202, 204 of the annular frame 200. Specifically, each magnet 300 includes a front magnet end 302 located at the front annular side face 202 and a rear magnet end 304 located at the rear annular side face 204.

Furthermore, each magnet 300 is a permanent dipole magnet which includes a first magnetic pole 306 and a second magnetic pole 308 which is located diametrically opposite the first magnetic pole 306. More specifically, each magnet 300 is divided into a first hemicylindrical portion 310 which defines the first magnetic pole 306 and a second hemicylindrical portion 312 which defines the second magnetic pole 308.

Each magnet 300 is further received in front and rear annular bearings 314, 316 disposed in the corresponding receiving bore 214 and is adapted to rotate about a magnet rotation axis $R_2$ which extends longitudinally through a center of the magnet 300. The magnets 300 are disposed in the annular frame 200 such that the magnet rotation axis $R_2$ is parallel to the wheel rotation axis $R_1$.

Each magnet 300 further defines a magnetic axis $M_1$ which extends through the first and second magnetic poles 306, 308, transversely to the magnet 300 and perpendicular to the magnet rotation axis $R_2$. It will therefore be understood that the rotation of the magnet 300 about its magnet rotation axis $R_2$ changes the orientation of the magnetic axis $M_1$.

Each magnet 300 is further rotatable between the non-active position in which the magnetic axis $M_1$ is oriented radially relative to the annular frame 200, and the active position in which the magnetic axis $M_1$ is oriented perpendicular to a radius of the annular frame 200, i.e. tangentially relative to the annular frame 200. More specifically, when the magnet 300 is in the active position, the first and second magnetic poles 306, 308 are oriented towards the two ferromagnetic portions 210a adjacent the non-ferromagnetic portion 210b in which the magnet 300 is received. In this position, the magnet 300 therefore magnetizes the two ferromagnetic portions 210a, which generates a magnetic field towards the wheel rim 158. When the wheel 150 is rotating, the magnetic field creates eddy current in the wheel rim 158, which in turn creates a second magnetic field which opposes the magnetic field generated by the magnet 300. This creates drag in the wheel rim 158, which opposes the rotation of the wheel 150 and therefore reduces the rotational speed of the wheel 150.

On the other hand, when the magnet 300 is in the non-active position, the first and second magnetic poles 306, 308 are not oriented towards the two adjacent ferromagnetic portions 210a, and therefore the two adjacent ferromagnetic portions 210a do not generate a magnetic field towards the wheel rim 158.

It will be understood that to move the magnet 300 between the active position and the non-active position, the magnet 300 may be rotated by a rotation angle of 90 degrees, or one quarter turn, about the magnet rotation axis $R_2$.

It will also be appreciated that in addition to the active and the non-active positions, the magnets 300 can further be rotated to one of a plurality of positions between the active and the non-active positions, in which the magnetic axis $M_1$ is angled at an angle of between 0 and 90 degrees relative to a radius of the annular frame 200. This allows the intensity of the magnetic field generated by the magnet 300 to be scaled between a maximum intensity when the magnet 300 is in the active position to a minimum intensity, i.e. no magnetic field being generated, when the magnet 300 is in the non-active position. The braking force provided by the eddy current braking system 102 can therefore be controlled by adjusting the intensity of the magnetic field.

Still in the illustrated embodiment, the braking system 100 further includes a magnetic field controller 400 operatively connected to the magnetic field generating member 104 to allow an intensity of the magnetic field generated by the magnetic field generating member 104 to be controlled. Specifically, when the vehicle is travelling on the ground surface, the magnetic field controller 400 may be used to reduce the rotation speed of the wheel 150 so as to thereby reduce the travelling speed of the vehicle.

In one embodiment, the magnetic field controller 400 may be operatively controlled by a user who may send a command, for example by depressing a brake pedal, to the magnetic field controller 400 to cause the magnetic field generating member 104 to generate a magnetic field at a desired intensity towards the wheel rim 158. The desired intensity may be selected according to a level of braking which is desired. Alternatively, the magnetic field controller 400 may be operatively connected to a central controller, such as a central controller of an autonomous vehicle, which may be connected to one or more sensors and which may actuate the magnetic field controller 400 to a certain level of braking in accordance to a detection or a measurement from the at least one sensor, such as a detection of an obstacle in the travel path of the vehicle.

In the illustrated embodiment, the magnetic field controller 400 includes a magnet actuator 402 operatively connected to the magnets 300 to allow the magnets 300 to be rotated between the active and non-active positions. Specifically, the magnet actuator 402 includes an annular guide member 404 which is disposed coaxially to the annular frame 200 and which is rotatable relative to the annular frame 200.

As best shown in FIG. 4, the annular guide member 404 is generally flat and extends parallel to the front annular side face 202 of the annular frame 200. More specifically, the annular guide member 404 abuts the front annular side face 202 of the annular frame 200 and engages a circular track 216 which extends forwardly from the cylindrical inner panel 212 and which holds the annular guide member 404 against the annular frame 200. The annular guide member 404 is therefore rotatable along the circular track 216 relative to the annular frame 200.

Turning to FIGS. 6A to 8B, the magnet actuator 402 further includes a plurality of magnet guiding members 406 connected to the magnets 300 which engage the annular guide member 404 such that rotation of the annular guide member 404 may selectively rotate the magnets 300 between the active and the non-active positions.

Figure 6A:
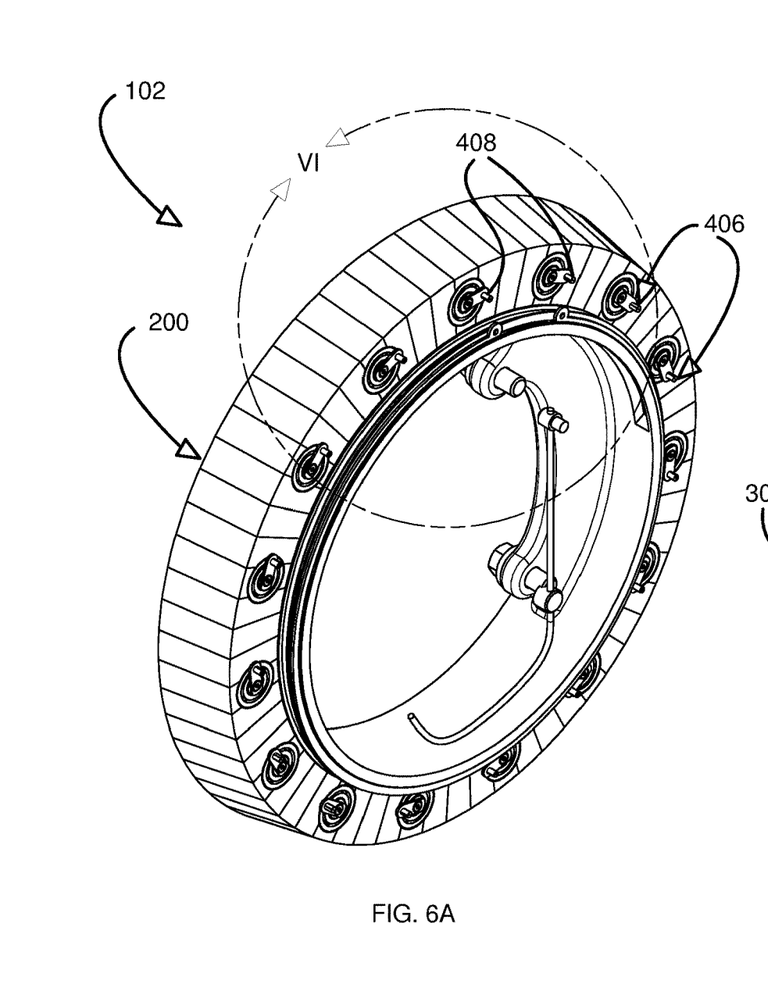
FIG. 6A is a top front elevation view of the eddy current braking system illustrated in FIG. 1, with the annular guide member removed to better show the magnet guiding members.
Figure 6B:
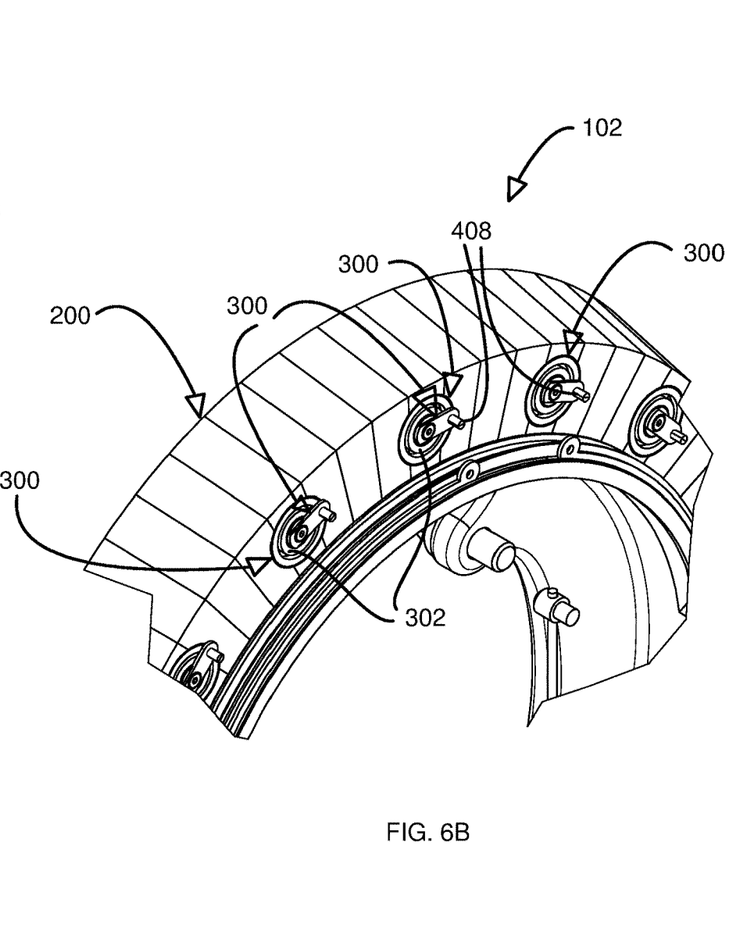
FIG. 6B is an enlarged portion, taken from area VI, of the eddy current braking system illustrated in FIG. 6A.

In the illustrated embodiment, each magnet guiding member 406 includes a guiding pin 408 which extends forwardly away from the front magnet end 302 of the corresponding magnet 300. The guiding pin 408 extends generally parallel to the magnet rotation axis $R_2$ and is further offset relative to the magnet rotation axis $R_2$.

Figure 7A:
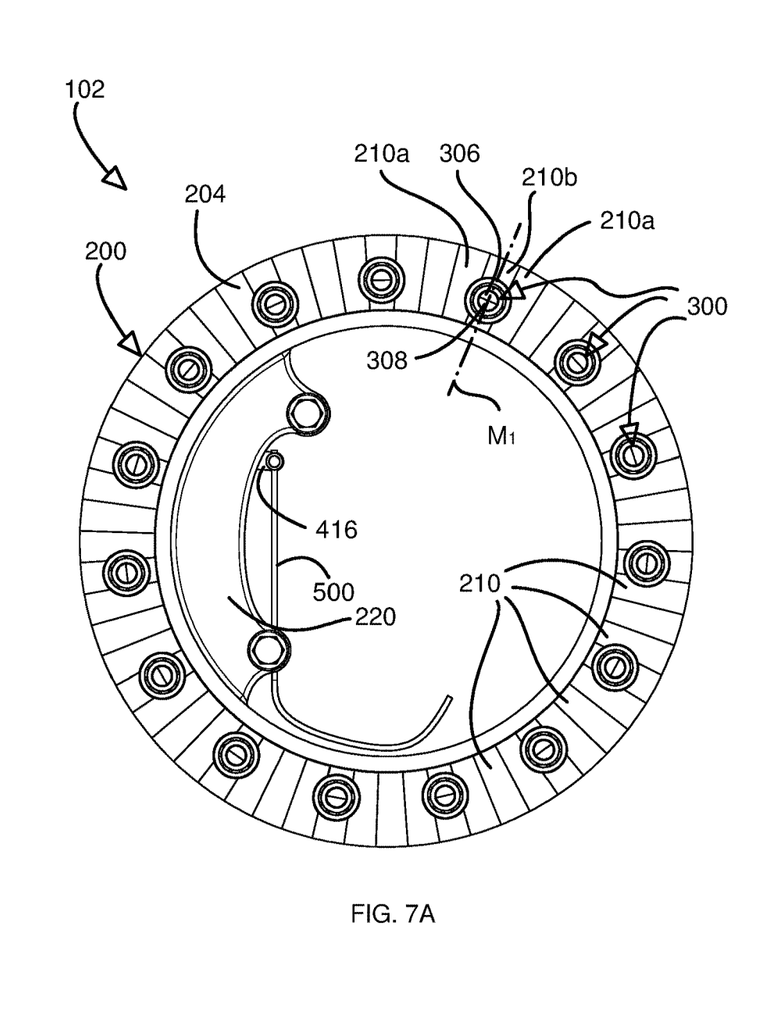
FIG. 7A is a rear elevation view of the wheel assembly illustrated in FIG. 1, with the magnets in the non-active position.
Figure 7B:
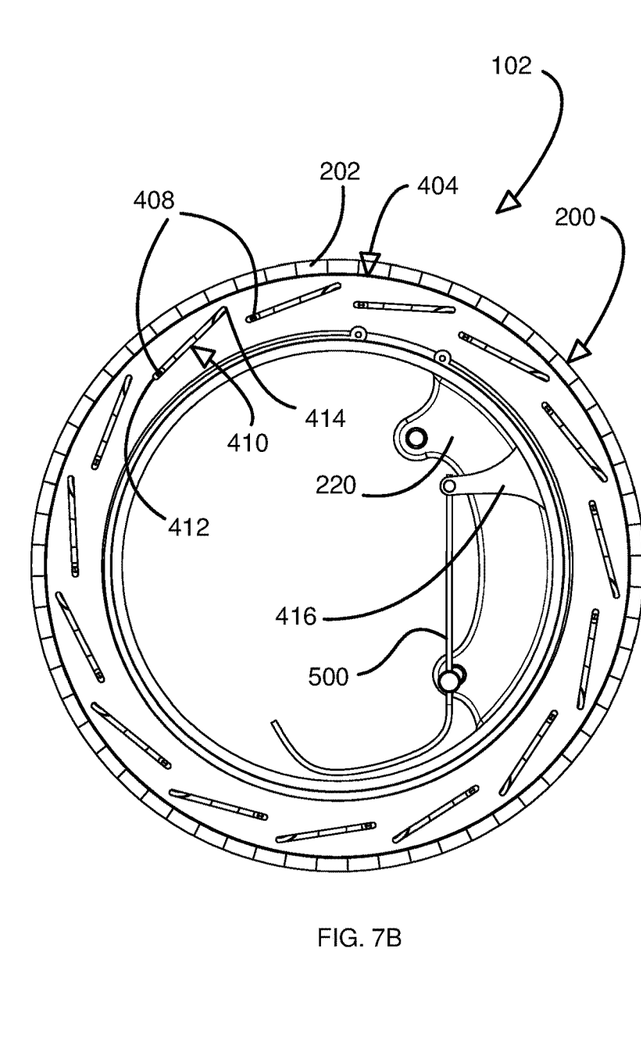
FIG. 7B is a front elevation view of the wheel assembly illustrated in FIG. 7A, with the magnets still in the non-active position.
Figure 8A:
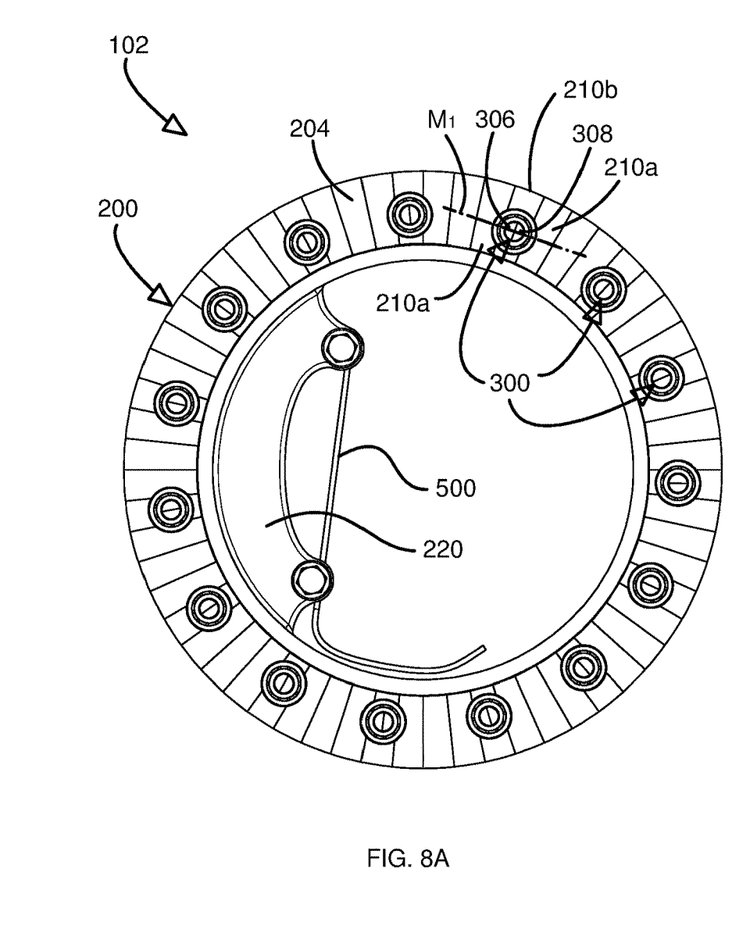
FIG. 8A is a rear elevation view of the wheel assembly illustrated in FIG. 1, with the magnets in the active position.
Figure 8B:
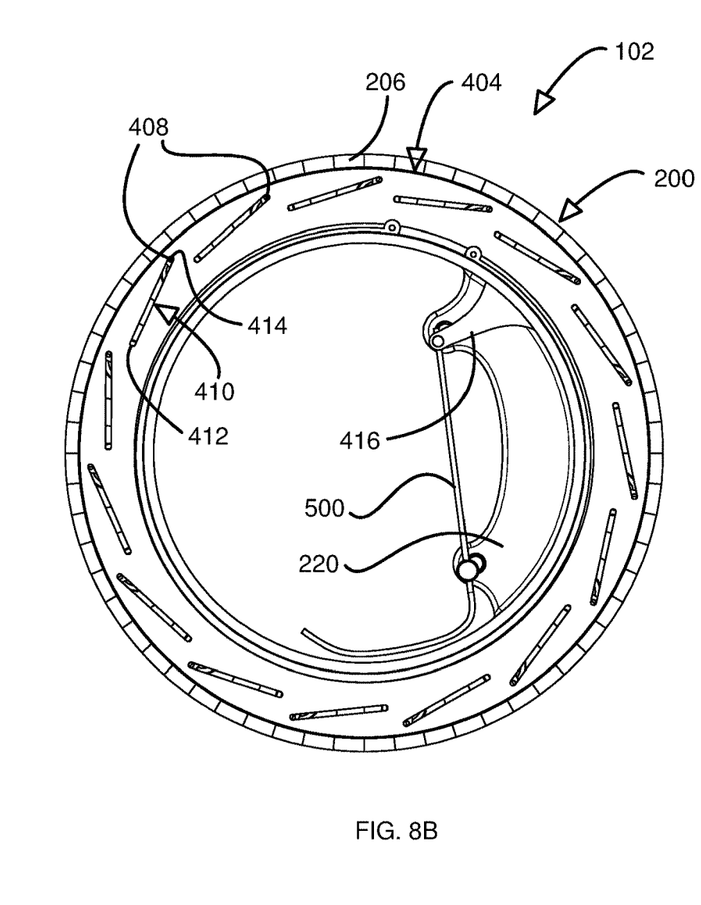
FIG. 8B is a is a front elevation view of the wheel assembly illustrated in FIG. 8A, with the magnets still in the active position.

The annular guide member 404 includes a plurality of guiding grooves 410 distributed around the annular guide member 404. Each guiding groove 410 is sized and shaped to receive the guiding pin 408 of a corresponding magnet 300 and to rotate the magnet 300 upon rotation of the annular guide member 404. Specifically, each guiding groove 410 is linear and is angled between a radial axis and a tangential axis of the annular guide member 404. In other words, the guiding groove 410 does not extend along a radius of the annular guide member 404 nor does it extend perpendicularly to a radius of the annular guide member 404, but is instead oriented between these two orientations. In this configuration, the guiding pin 408 is captive within the corresponding guiding groove 410 and slides within the guiding groove 410 when the annular guide member 404 is rotated, thereby causing the magnet 300 to rotate about its magnet rotation axis $R_2$ from the non-active position, as shown in FIGS. 7A and 7B, to the active position, as shown in FIGS. 8A and 8B.

Furthermore, each guiding groove 410 has a first groove end 412 and a second groove end 414 opposite the first groove end 412. In the illustrated embodiment, the guiding groove 410 is sized and shaped such that the magnets 300 are in the active position when the guiding pin 408 is substantially at the first groove end 412 and in the non-active position when the guiding pin 408 is substantially at the second groove end 414.

Figure 1:
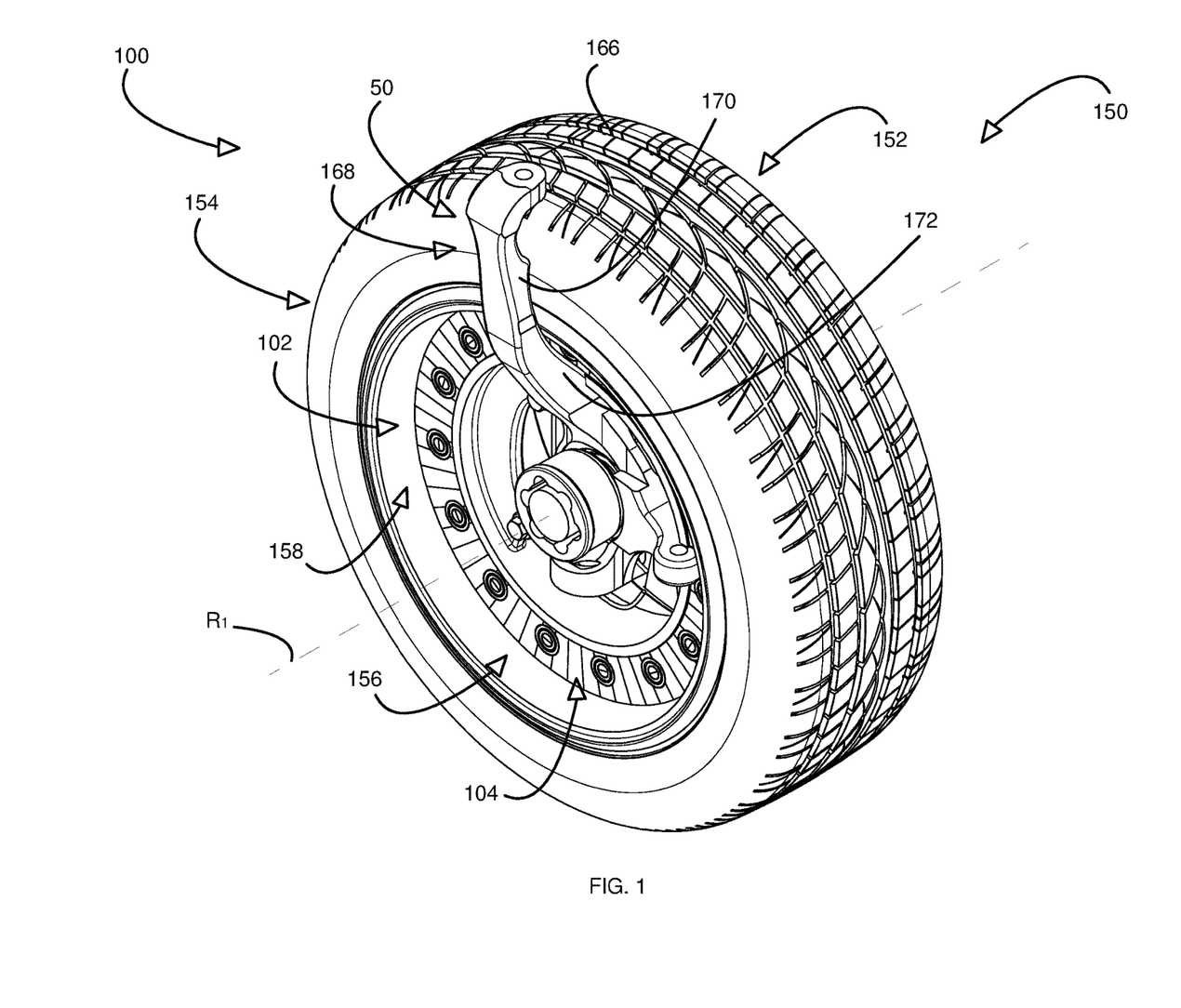
FIG. 1 is a top rear perspective view of a wheel assembly including a wheel rim and an eddy current braking system, in accordance with one embodiment.
Figure 2:
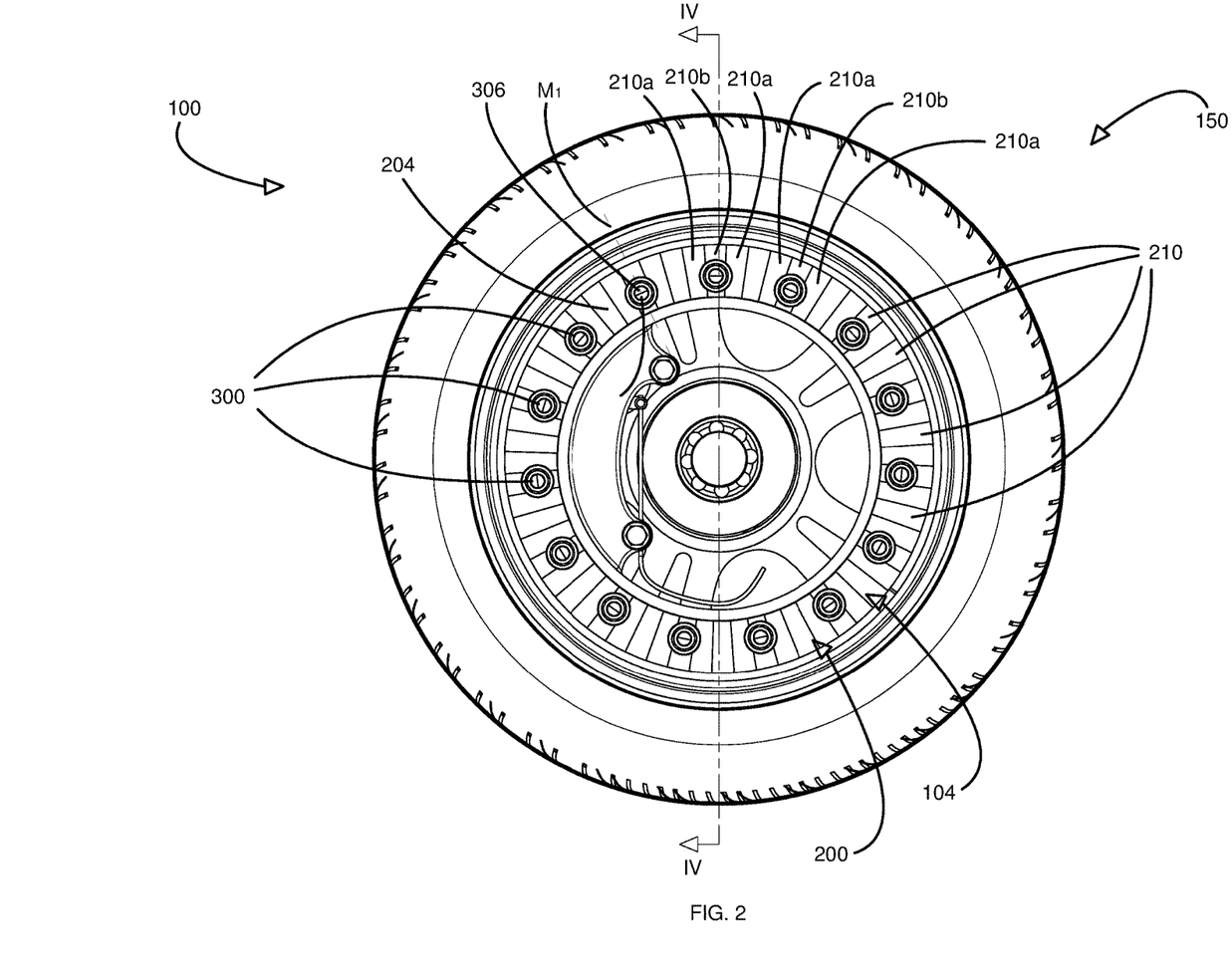
FIG. 2 is a rear elevation view of the wheel assembly illustrated in FIG. 1.
Figure 3:
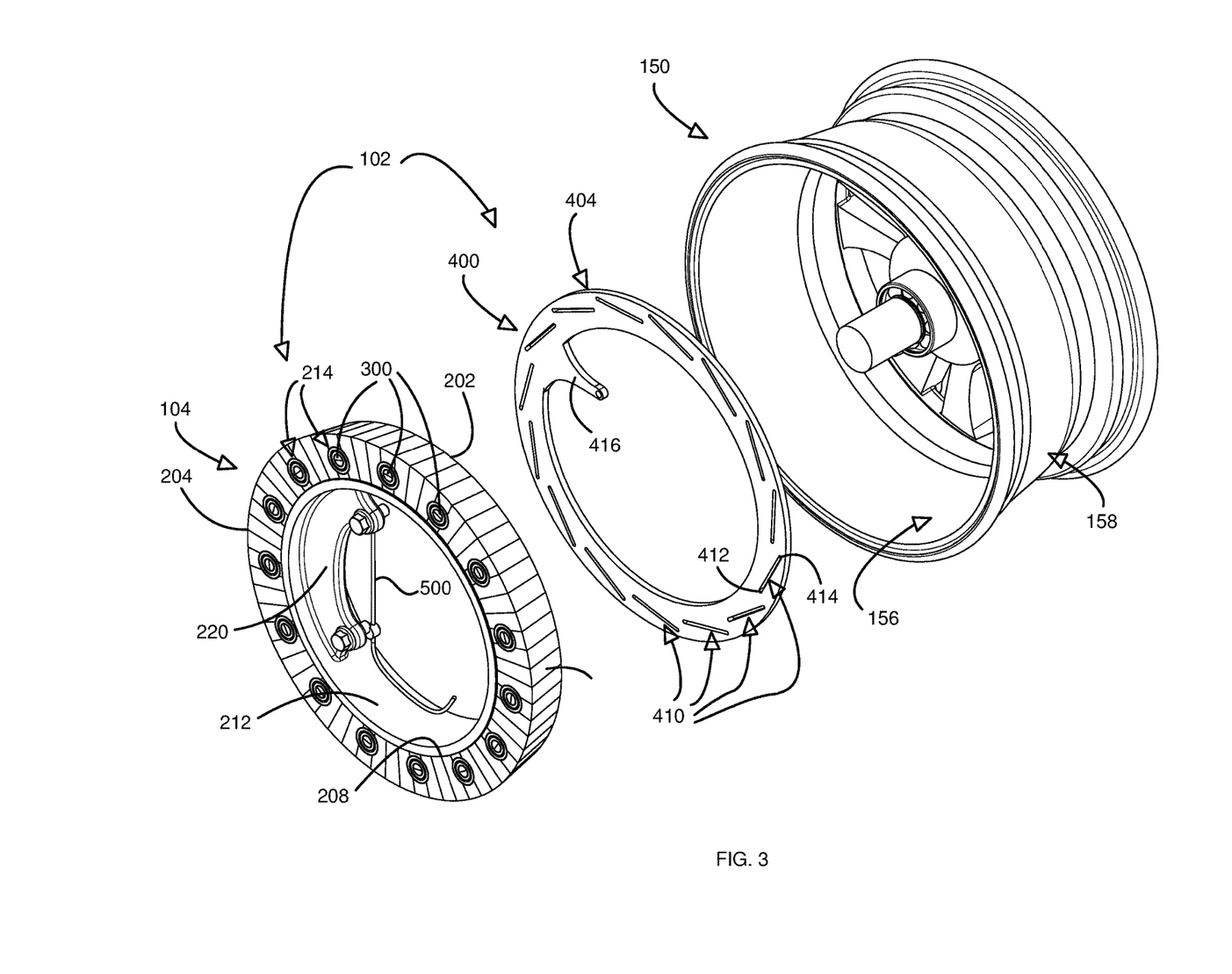
FIG. 3 is an exploded perspective view of the wheel assembly illustrated in FIGS. 1 and 2, with the tire removed.

As best shown in FIG. 2, the annular guide member 404 further includes a central tab 416 which projects radially inwardly within the annular guide member 404 towards the wheel rotation axis $R_1$. In the illustrated embodiment, the annular frame 200 further includes a central tab 220 which also projects radially inwardly from the cylindrical inner panel 212. The central tabs 416, 220 of the annular guide member 404 and of the annular frame 200 are further adapted to be joined by a brake cable 500 which can be pulled to rotate the annular guide member 404 relative to the annular frame 200.

Alternatively, instead of a brake cable, the annular guide member 404 may be moved relative to the annular frame 200 using another actuating means such as hydraulic fluid lines, one or more servomotors or any other actuators which a skilled person would consider to be appropriate.

Figure 9:
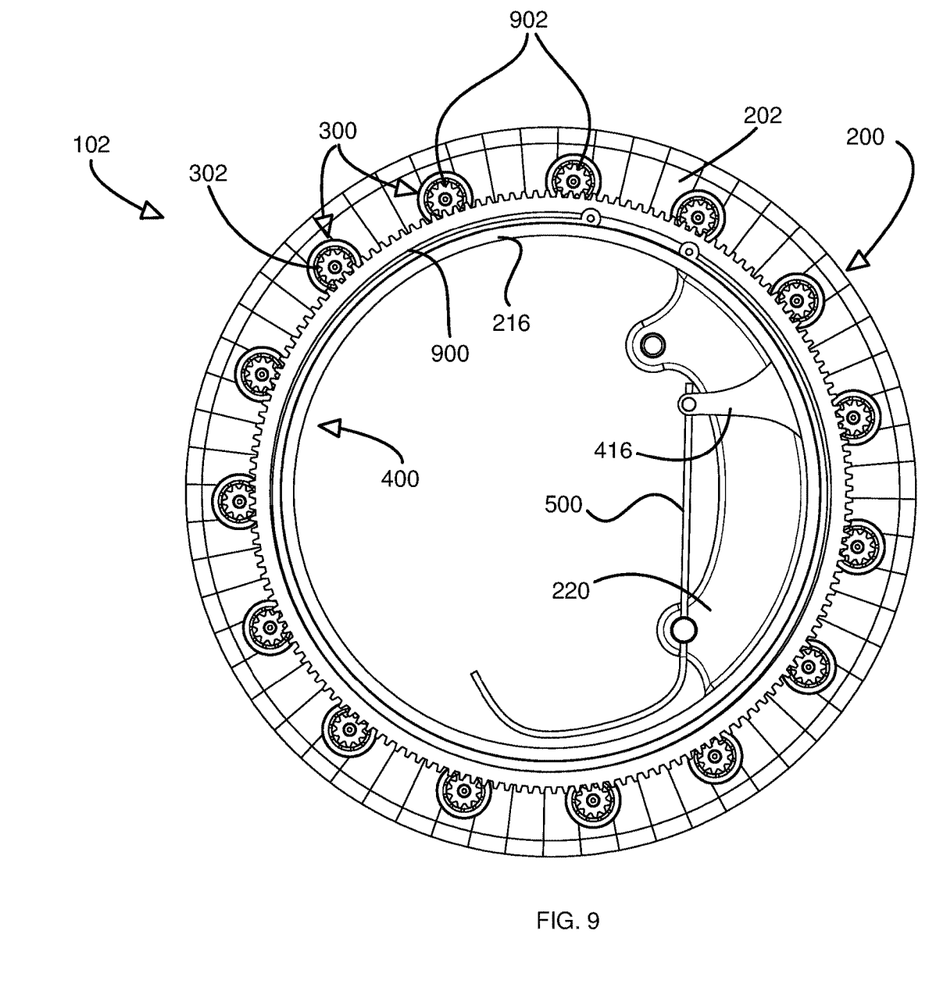
FIG. 9 is a rear elevation view of an eddy current braking system, in accordance with another embodiment.

Now turning to FIG. 9, there is shown the eddy current brake system 100, in accordance with another embodiment. In this embodiment, the magnetic field controller 400 includes an annular gear 900 which extends within the circular track 216 instead of the annular guide member 404. Furthermore, each magnet guiding member 406 includes a magnet gear 902 which secured to the front magnet end 302 of a corresponding magnet 300 and which is mounted coaxially on the magnet 300. The magnet gear 902 is also fixed in rotation relative to the magnet 300 such that rotation of the magnet gear 902 causes rotation of the corresponding magnet 300. The magnet gear 902 further meshably engages the annular gear 900, such that rotation of the annular gear 900 therefore causes rotation of the magnet gears 902 and of the magnets 300 about the magnet rotation axis $R_2$ in the opposite rotation direction.

It will be understood that in the above configurations illustrated in FIGS. 1-8 and in FIG. 9, rotation of the annular guide member 404 simultaneously rotates all the magnets 300. Alternatively, the magnetic field controller 400 could instead be configured to rotate multiple groups of magnets 300 independently from each other. For example, the guiding grooves 410 could include a first group of guiding grooves having a first configuration for engaging a first plurality of the magnets 300 and a second group of guiding grooves having a second configuration for engaging a second plurality of the magnets 300. The first and second configurations may be different from each other such that rotation of the annular guide member 404 up to a predetermined angle causes the first group of guiding grooves to rotate the first plurality of the magnets 300, and further rotation of the annular guide member 404 beyond the predetermined angle causes the second group of guiding grooves to rotate the second plurality of the magnets 300. It will be understood that the guiding grooves 410 could further include additional groups of guiding grooves having different configurations and engaging additional pluralities the magnets 300.

In yet another embodiment, the magnetic field controller 400 could instead include more than one movable guide member, each movable guide member being operatively connected to some of the magnets 300 and the movable guide members being movable independently from each other such that a first plurality of the magnets 300 may be moved to a first angular position providing a first magnetic field intensity and a second plurality of magnets 300 may be moved to a second angular position providing a second magnetic field intensity different from the first magnetic field intensity. It will be understood that the magnetic field controller 400 could further include additional movable guide members engaging additional pluralities the magnets 300 and configured for moving the additional pluralities the magnets 300 into different angular positions.

In yet another embodiment, each magnet 300 may be connected to a rotary actuator such as a servomotor, a stepper motor or the like, and each rotary actuator may be actuated individually such that each magnet 300 may be rotated individually. In this embodiment, the breaking force applied to the wheel rim 158 may be scaled depending on the number of magnets rotated at least partially towards the active position at once and on the intensity of the magnetic field generated by the rotated magnets 300.

It will be understood that the present eddy current braking system 102 presents a number of advantages when compared to existing braking systems.

For example, in contrast to conventional friction braking systems, the eddy current braking system 102 is frictionless, thereby eliminating the wear on the braking system and therefore the need to change parts of the braking system to ensure optimal braking force on the wheel.

Furthermore, in contrast to other eddy current braking system, the eddy current braking system 102 does not require an additional rotor element to interact with the magnetic field generating member 104, since the eddy currents are generated directly in the wheel rim 158. This simplifies the braking system 100, and further allows the diameter of the annular frame 200 to be maximized (i.e. close to the inner diameter of the wheel rim 158) to also maximize the available braking torque.

It will also be appreciated that the present eddy current braking system 102 is particularly well adapted for replacing a conventional braking system of a vehicle, such as a friction braking system. Specifically, it will be appreciated that at least some vehicles include a brake mounting arm similar to the brake mounting arm.

To replace the existing friction braking system, a wheel assembly including a wheel and the existing friction braking system operatively connected to the wheel may first be provided. In one embodiment, the wheel assembly is mounted on a vehicle which includes a chassis comprising a brake mounting arm similar to the brake mounting arm 168 described above. In this embodiment, the friction braking system may include a brake caliper mounted to the brake mounting arm and a brake disc mounted to a wheel spindle within a wheel rim of the wheel, similar to the wheel rim 158 described above.

The friction braking system may then be removed from the wheel assembly. More specifically, the brake caliper may be removed from the brake mounting arm and the brake disc may be removed from the wheel spindle.

The eddy current braking system 102 may then be operatively mounted to the wheel. More specifically, the annular frame 200 may be connected to the brake mounting arm such that the annular frame 200 is disposed annularly within the wheel rim so as to be proximal to the wheel rim.

It will further be appreciated that the arrangements described above are merely provided as examples, and that various alternative configurations may be considered. For example, instead of comprising permanent dipole magnets which can move between the active and non-active positions, the magnetic field generating member 104 could instead include a plurality of electromagnets mounted in the annular frame 200 and the magnetic field controller 400 could include a variable power source operatively connected to the electromagnets to selectively generate a magnetic field from one or more of the electromagnets. In this embodiment, each electromagnet could be operated individually from the other electromagnets to allow the breaking force applied to the wheel rim 158 to be scaled depending on the number of electromagnets activated at once and on the intensity of the magnetic field generated by the activated electromagnets.

Furthermore, while the above description is directed to a single wheel assembly of a vehicle, it will be understood that similar wheel assemblies including eddy current braking systems 102 as described above may further be used in more than one wheel of the vehicle. For example, a vehicle such as a car which has four wheels could have four eddy current braking systems 102, each eddy current braking system 102 being mounted on a corresponding wheel.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. An eddy current braking system for a wheel of a vehicle, the vehicle including a chassis and the wheel being rotatably mounted to the chassis, the wheel including a wheel rim made of an electrically-conductive material and extending annularly around a wheel cavity, the system comprising:
   a magnetic field generating member secured to the chassis and disposed annularly within the wheel cavity and proximal to the wheel rim, the magnetic field generating member being operable for generating a magnetic field towards the wheel rim to generate eddy current within the wheel rim upon rotation of the wheel, the magnetic field generating member including:
      an annular frame configured to be coaxially disposed within the wheel rim, the annular frame including a plurality of spaced-apart ferromagnetic portions and a plurality of spaced-apart non-ferromagnetic portions, the ferromagnetic portions and non-ferromagnetic portions being arranged in an alternating pattern along the annular frame, the annular frame further including a plurality of receiving bores extending through one of the non-ferromagnetic portions of the annular frame;
      a plurality of movable dipole magnets, each movable dipole magnet being rotatably mounted in a corresponding receiving bore of the annular frame; and
   a magnetic field controller operatively connected to the magnetic field generating member for selectively controlling an intensity of the magnetic field applied by the magnetic field generating member on the wheel rim,
   wherein the movable dipole magnets are permanent magnets.

2. The system as claimed in claim 1, wherein the annular frame has a first annular side face and a second annular side face,
   and further wherein each movable dipole magnet has a first magnetic pole, a second magnetic pole located diametrically opposite the first magnetic pole and a magnetic axis extending through the first and second magnetic poles.

3. The system as claimed in claim 2, wherein the receiving bores and the movable dipole magnets are cylindrical.

4. The system as claimed in claim 3, wherein each movable dipole magnet includes a first hemicylindrical portion defining the first magnetic pole and a second hemicylindrical portion defining the second magnetic pole.

5. The system as claimed in claim 2, wherein each movable dipole magnet is received in at least one annular bearing disposed in the corresponding receiving bore.

6. The system as claimed in claim 2, wherein each receiving bore has a bore diameter corresponding to a diameter of a corresponding movable dipole magnet to allow the movable dipole magnet to be snuggly received in the receiving bore.

7. The system as claimed in claim 6, wherein the bore diameter is greater than a width of the corresponding non-ferromagnetic portion such that the bore further extends partially into the first and second adjacent ferromagnetic portions.

8. The system as claimed in claim 2, wherein the magnetic field controller includes a magnet actuator operatively connected to at least one of the movable dipole magnets for selectively rotating the at least one of the movable dipole magnets between an active position in which the magnetic axis of the at least one of the movable dipole magnets is oriented tangentially to the annular frame such that the first and second magnetic poles respectively face first and second adjacent ferromagnetic portions adjacent the corresponding non-ferromagnetic portion to magnetize the first and second adjacent ferromagnetic portions, and a non-active position in which the magnetic axis is oriented radially to the annular frame.

9. The system as claimed in claim 8, wherein the magnet actuator is further configured for selectively rotating the at least one of the movable dipole magnets to one of a plurality of intermediate positions between the active position and the non-active position.

10. The system as claimed in claim 8, wherein the magnet actuator is adapted to simultaneously rotate all the movable dipole magnets.

11. The system as claimed in claim 10, wherein the magnet actuator includes:
   an annular guide member disposed coaxially to the annular frame and rotatable relative to the annular frame; and
   a plurality of magnet guiding members, each magnet guiding member extending from a corresponding movable magnet, the magnet guiding members being configured to cooperate with the annular guide member to rotate the movable magnets upon rotation of the annular guide member.

12. The system as claimed in claim 11, wherein each movable dipole magnet includes a first magnet end disposed towards the first annular side face of the frame and a second magnet end disposed towards the second annular side face, each magnet guiding member including a guiding pin extending away from the second magnet end of the corresponding movable magnet, the guiding pin being offset relative to a rotation axis of the movable dipole magnet.

13. The system as claimed in claim 12, wherein the annular guide member includes a plurality of guiding grooves, each guiding groove being sized and shaped to receive the guiding pin of a corresponding movable magnet and to rotate the movable magnet upon rotation of the annular guide member.

14. The system as claimed in claim 13, wherein each guiding groove is linear and is angled between a radial axis and a tangential axis of the annular guide member.

15. The system as claimed in claim 11, wherein each magnet guiding member includes a driven gear coaxially mounted to the movable dipole magnet and the annular guide member includes an annular gear operatively engaging the driven gear.

16. A method for installing an eddy current braking system on a vehicle, the method comprising:
   providing a wheel assembly including a wheel and a friction braking system operatively connected to the wheel;
   removing the friction braking system from the wheel; and
   operatively mounting an eddy current braking system according to claim 1 to the wheel.

17. The method as claimed in claim 16, wherein the wheel includes a wheel rim made of an electrically-conductive material, and further wherein operatively connecting the magnetic braking system comprises:
   disposing the annular frame within the wheel rim, coaxially and spaced inwardly from the wheel rim.

18. A wheel assembly for a vehicle, the vehicle including a chassis, the assembly comprising:
   a wheel rotatably connected to the chassis, the wheel including a wheel rim made of an electrically-conductive material;
   an annular frame coaxially disposed within the wheel rim and spaced radially inwardly therefrom, the circular frame having a first annular side face and a second annular side face, the circular frame including:
      a plurality of spaced-apart ferromagnetic portions and a plurality of spaced-apart non-ferromagnetic portions, the ferromagnetic portions and non-ferromagnetic portions being arranged in an alternating pattern along the annular frame;
      a plurality of receiving bores defined in the annular frame, each receiving bore extending through one of the non-ferromagnetic portions between the first and second annular side faces;
      a plurality of movable dipole magnets rotatably mounted to the annular frame, each movable dipole magnet being received in a corresponding receiving bore, each movable dipole magnet having a first magnetic pole, a second magnetic pole located diametrically opposite the first magnetic pole and a magnetic axis extending through the first and second magnetic poles;
   a magnet actuator operatively connected to the movable dipole magnets for selectively rotating each movable dipole magnet between an active position in which the magnetic axis of the movable dipole magnet is oriented tangentially to the annular frame such that the first and second magnetic poles respectively face first and second adjacent ferromagnetic portions adjacent the corresponding non-ferromagnetic portion to magnetize the first and second adjacent ferromagnetic portions, and a non-active position in which the magnetic axis is oriented radially to the annular frame.

* * * * *